(12) United States Patent
Robertson

(10) Patent No.: US 7,946,342 B1
(45) Date of Patent: May 24, 2011

(54) IN SITU GENERATION OF STEAM AND ALKALINE SURFACTANT FOR ENHANCED OIL RECOVERY USING AN EXOTHERMIC WATER REACTANT (EWR)

(75) Inventor: Eric P. Robertson, Idaho Falls, ID (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 89 days.

(21) Appl. No.: 12/432,793

(22) Filed: Apr. 30, 2009

(51) Int. Cl.
*E21B 43/22* (2006.01)
*E21B 43/24* (2006.01)
*C09K 8/92* (2006.01)

(52) U.S. Cl. .................. 166/272.3; 166/263; 166/272.1; 166/275; 166/300; 166/302; 166/303; 166/369; 507/269; 507/270; 507/276; 507/902

(58) Field of Classification Search .................. None
See application file for complete search history.

(56) References Cited

U.S. PATENT DOCUMENTS

| | | | | |
|---|---|---|---|---|
| 2,218,306 A | * | 10/1940 | Austerman | 166/300 |
| 2,672,201 A | * | 3/1954 | Lorenz | 166/302 |
| 2,799,342 A | * | 7/1957 | Fatt | 166/302 |
| 3,618,667 A | * | 11/1971 | Snavely, Jr. | 166/310 |
| 4,007,791 A | * | 2/1977 | Johnson | 166/300 |
| 4,085,799 A | * | 4/1978 | Bousaid et al. | 166/272.4 |
| 2009/0301731 A1 | * | 12/2009 | McDaniel et al. | 166/372 |

* cited by examiner

*Primary Examiner* — George Suchfield
(74) *Attorney, Agent, or Firm* — Michael J. Dobbs; Daniel D. Park; John T. Lucas

(57) ABSTRACT

A method for oil recovery whereby an exothermic water reactant (EWR) encapsulated in a water soluble coating is placed in water and pumped into one or more oil wells in contact with an oil bearing formation. After the water carries the EWR to the bottom of the injection well, the water soluble coating dissolves and the EWR reacts with the water to produce heat, an alkali solution, and hydrogen. The heat from the EWR reaction generates steam, which is forced into the oil bearing formation where it condenses and transfers heat to the oil, elevating its temperature and decreasing the viscosity of the oil. The aqueous alkali solution mixes with the oil in the oil bearing formation and forms a surfactant that reduces the interfacial tension between the oil and water. The hydrogen may be used to react with the oil at these elevated temperatures to form lighter molecules, thus upgrading to a certain extent the oil in situ. As a result, the oil can flow more efficiently and easily through the oil bearing formation towards and into one or more production wells.

13 Claims, 4 Drawing Sheets

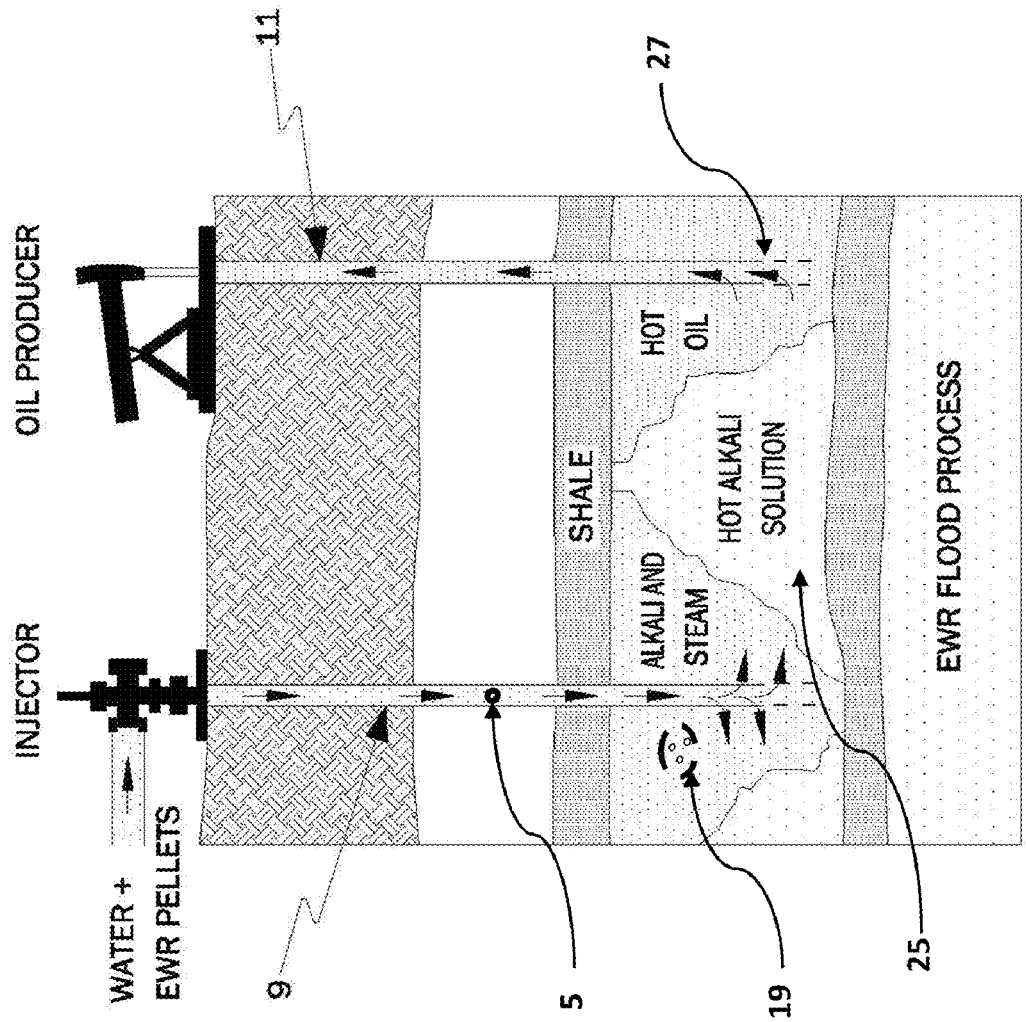

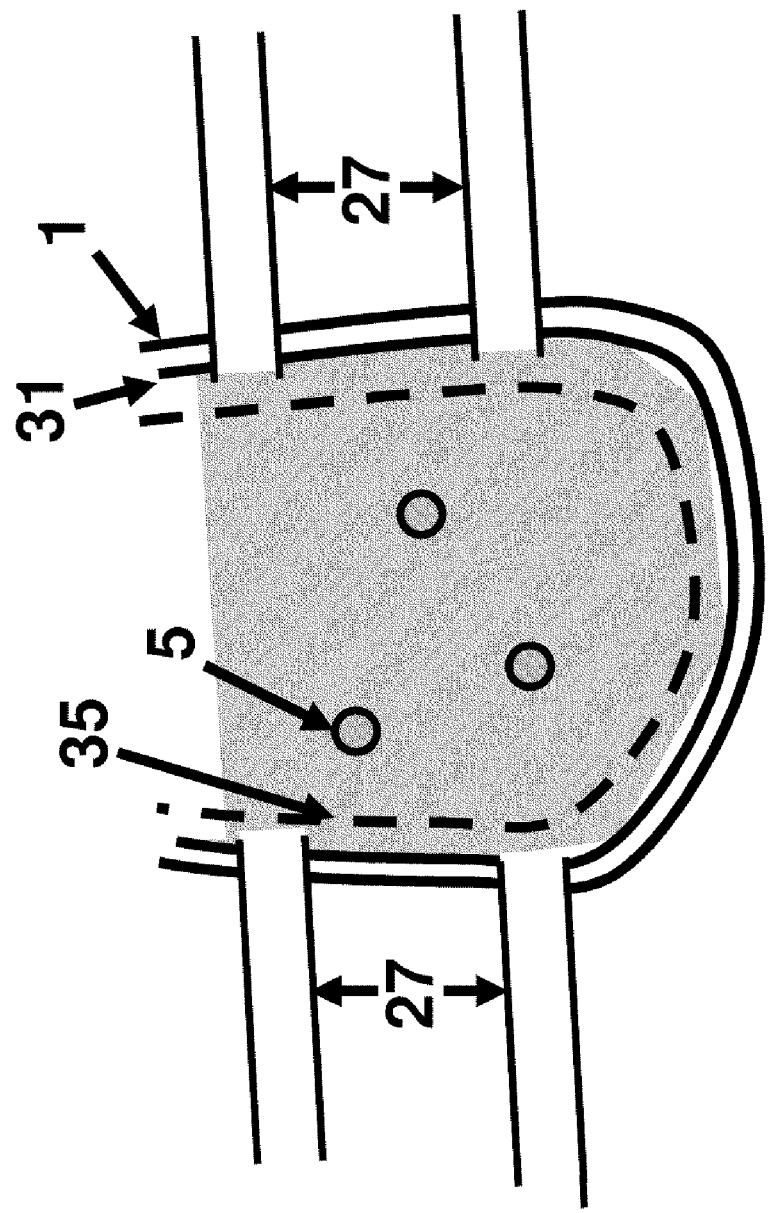

US 7,946,342 B1

IN SITU GENERATION OF STEAM AND ALKALINE SURFACTANT FOR ENHANCED OIL RECOVERY USING AN EXOTHERMIC WATER REACTANT (EWR)

GOVERNMENT INTERESTS

The United States Government has rights to this invention pursuant to Contract No. DE-AC07-05ID14517, between the U.S. Department of Energy (DOE) and Battelle Energy Alliance.

FIELD OF THE INVENTION

One embodiment of the present invention relates to a device and method for enhanced oil recovery, preferably the recovery of medium or heavy oil.

BACKGROUND OF THE INVENTION

As the demand for crude oil increases, there is a need for alternative sources of oil and improvements to current methods for procuring oil. Although there is significant oil in the United States, much of it is heavy oil which has yet to be efficiently and successfully obtained. Heavy oil is viscous and does not flow easily, resulting in very low recovery of the resource. There has been some success in significantly decreasing the viscosity of the heavy oil, but current methods are limited by the depth from surface of the heavy oil, as well as cost and efficiency of recovery methods.

The most popular process of heavy oil recovery at depths less than 2,000 feet below ground level is the injection of surface-generated steam. In this process, steam is pumped from the surface into an oil bearing formation through an injection well. The heat from the steam is transferred to the oil through condensation, conduction and convection. This reduces the oil viscosity and allows the oil to flow more easily into the production well for extraction. One example of a steam injection technique is described in U.S. Pat. No. 3,482,630 hereby fully incorporated by reference.

Alkaline flooding is another process used to recover medium to heavy oil where an alkaline solution is injected from the surface into an oil bearing formation containing an acidic crude oil. Most medium and heavy oils are acidic. As discussed in U.S. Pat. No. 4,813,483, hereby fully incorporated by reference, the chemical reaction between the injected alkaline and the acidic crude oil forms surfactants which reduce the interfacial tension between the oil and the water and allows for enhanced oil recovery.

SUMMARY OF THE INVENTION

A method for oil recovery, preferably medium or heavy oil, comprising creating one or more oil wells in earth, preferably at a depth greater than 2,000 feet. An exothermic water reactant (EWR) encapsulated in a water soluble coating is positioned in one or more oil wells with water. After the water soluble coating of the EWR dissolves, the EWR and water react to preferably produce heat, an alkali solution, and hydrogen gas according to the following general chemical reaction equation:

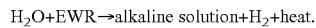

The water soluble coating surrounding the exothermic water reactant (EWR) prohibits the above reaction from taking place until the coating is dissolved. Preferably, excess water remains after the initial reaction between water and EWR. The heat produced from the EWR reaction is preferably used to convert all or a portion of the excess water into steam. The EWR reaction products (steam, hydrogen gas, and aqueous alkaline solution) are preferably forced into an oil bearing formation by fluid pressure exerted by one or more injection pumps located on the surface.

As the generated steam travels from the oil well into the oil bearing formation, it condenses, transferring its heat into the oil, thus decreasing its viscosity. The aqueous alkali solution mixes with the oil and forms a surfactant that reduces the interfacial tension between the oil and the water. As a result, the affected oil can be more easily and efficiently swept from the oil bearing formation. The hydrogen may be used to react with the oil at these elevated temperatures to form lighter molecules, thus upgrading through breaking carbon chains to a certain extent the oil in situ. As a result, the resulting affected oil is then recovered from the one or more oil wells.

In one embodiment, the EWR and water are injected for a limited time into a single oil well serving as both an injection well and a production well. Preferably, the single oil well is then shut-in (not used for either production or injection) for a time while the generated steam and alkaline solution equilibrates with the oil in the oil bearing formation near the wellbore. The single oil well is then opened and the affected oil that enters into the single oil well is produced from the same oil well. This process could be repeated in a cyclical stimulation fashion.

In another embodiment, the EWR and water mixture and EWR reaction products are continuously injected through one or more injection wells while the affected oil is produced from one or more production wells.

BRIEF DESCRIPTION OF THE DRAWINGS

FIG. 3 shows a cross-sectional view of one embodiment of In Situ Generation of Steam and Alkaline Surfactant for Enhanced Oil Recovery using an exothermic water reactant (EWR) having an injection well and a production well.

FIG. 4 illustrates a cross sectional view of one embodiment of the bottom of an oil well in which a screen is used to prevent the EWR encapsulated in water soluble coating from passing through the perforations.

DETAILED DESCRIPTION OF THE INVENTION

Figure 1:
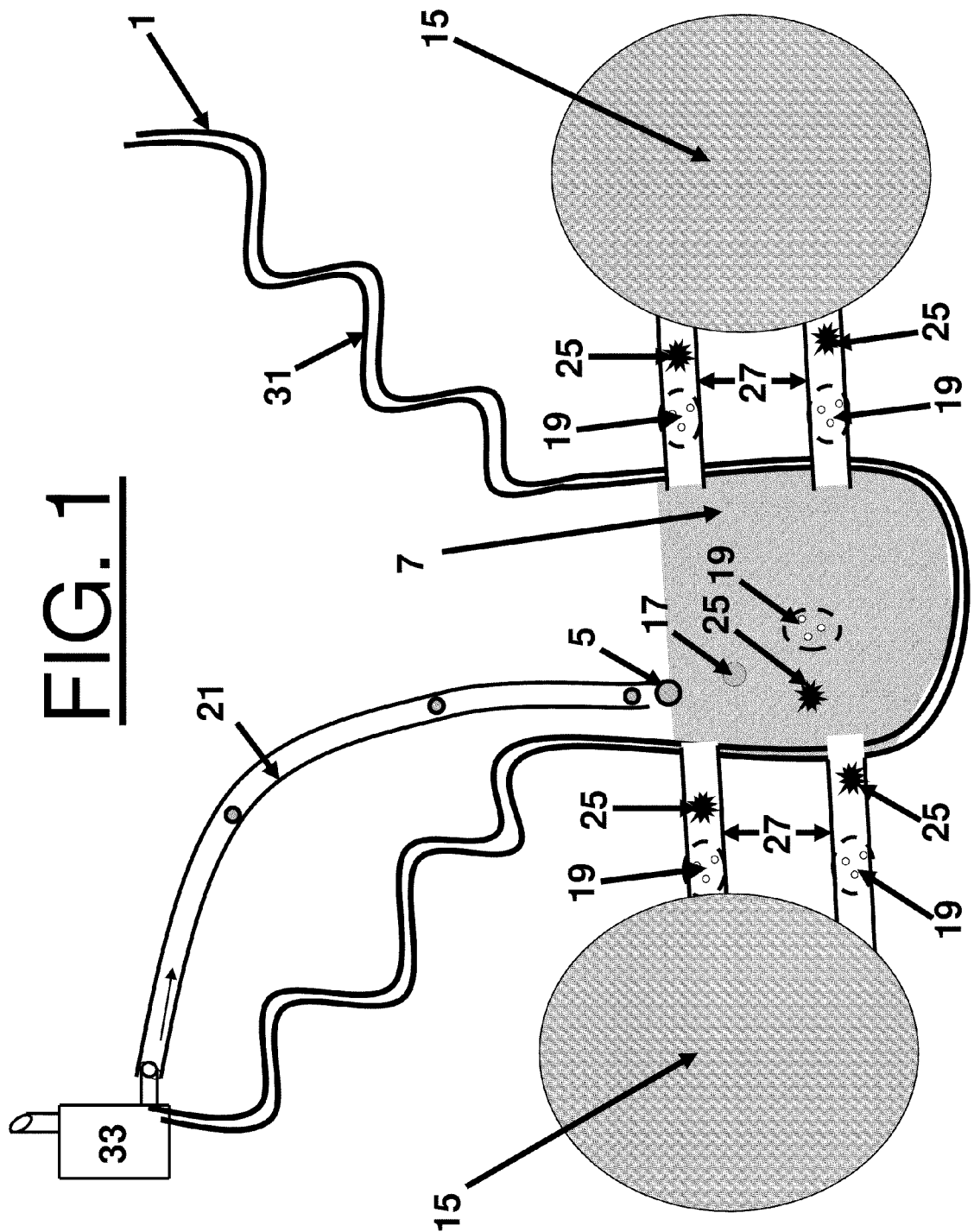
FIG. 1 shows a cross-sectional view of In Situ Generation of Steam and Alkaline Surfactant for Enhanced Oil Recovery using an exothermic water reactant (EWR).

A method for oil recovery, preferably medium or heavy oil, comprising creating one or more oil wells in earth, preferably at a depth greater than 2,000 feet. An exothermic water reactant (EWR) encapsulated in a water soluble coating is positioned in one or more oil wells with water. After the water soluble coating of the EWR dissolves, the EWR and water react to preferably produce heat, an alkali solution, and hydrogen gas according to the following general chemical reaction equation:

The water soluble coating surrounding the exothermic water reactant (EWR) prohibits the above reaction from taking place until the coating is dissolved. Preferably, excess water remains after the initial reaction between water and EWR. The heat produced from the EWR reaction is preferably used to convert all or a portion of the excess water into steam. The EWR reaction products (steam, hydrogen gas, and aqueous alkaline solution) are preferably forced into an oil bearing formation by fluid pressure exerted by one or more injection pumps located on the surface.

As the generated steam travels from the oil well into the oil bearing formation, it condenses, transferring its heat into the oil, thus decreasing its viscosity. The aqueous alkali solution mixes with the oil and forms a surfactant that reduces the interfacial tension between the oil and the water. As a result, the affected oil can be more easily and efficiently swept from the oil bearing formation. The hydrogen may be used to react with the oil at these elevated temperatures to form lighter molecules, thus upgrading through breaking carbon chains to a certain extent the oil in situ. As a result, the resulting affected oil is then recovered from the one or more oil wells.

In one embodiment, the EWR and water are injected for a limited time into a single oil well serving as both an injection well and a production well. Preferably, the single oil well is then shut-in (not used for either production or injection) for a time while the generated steam and alkaline solution equilibrates with the oil in the oil bearing formation near the wellbore. The single oil well is then opened and the affected oil that enters into the single oil well is produced from the same oil well. This process could be repeated in a cyclical stimulation fashion.

In another embodiment, the EWR and water mixture and EWR reaction products are continuously injected through one or more injection wells while the affected oil is produced from one or more production wells.

In one embodiment, the EWR reaction is optimized for the desired EWR reaction products. For example, different EWRs will react with water at different rates to produce hydrogen, heat, and an alkaline solution. This hydrogen can be used to preprocess the oil in-situ during extraction, which can ease or even eliminate some refining steps.

Oil

The oil is any type of crude oil that does not flow easily. Preferably, the oil has a high viscosity, a high specific gravity, as well as a heavy molecular composition. Examples of oil include, but are not limited to: Conventional (light) Oil (API gravity >25 (s.g. <0.9042)); Medium Oil (20<API gravity≦25 (0.9042< s.g. <0.9340)); Heavy Oil (10API<API gravity≦20API (0.9340< s.g. <1.0000)); Natural Bitumen: API gravity≦10API (1.0000< s.g.)). Preferably, the oil is a medium or heavy oil having a specific gravity greater than 0.9042.

Affected oil is oil that has been exposed to the heat, aqueous alkali solution, hydrogen generated by the EWR reaction, or combinations thereof. Therefore, the affected oil has an increased viscosity, reduced interfacial tension, reduced carbon chain length, or combinations thereof.

Oil Well

An oil well is constructed for access to oil and allows for oil capture, oil extraction, freeing of an oil bearing formation or a combination thereof. An injection well is an oil well used for insertion of the EWR, water and any other compounds into a oil bearing formation. A production well is an oil well used to extract affected oil affected by the EWR reaction. Any known means of creating an oil well may be used. An oil well is preferably created by drilling a surface hole, approximately twelve inches in diameter to a selected depth. The drilling is preferably repeated in approximately 1,500 feet increments, if necessary, where the diameter of the oil well is decreased by a few inches at each increment. The resulting oil well is preferably created to a preset depth through the rock formation containing trapped oil. The oil bearing formation is isolated from other rock formations encountered during the creation of the oil well by any known means, such that only the oil bearing formation is in open contact or fluid communication with the created oil well.

An oil bearing formation is any formation below ground in which oil is present. Preferably, the oil bearing formation contains oil within the pore structure of the formation which is subsequently affected using the EWR reaction and subsequently extracted through an oil well.

After the final depth of the oil well is reached, the oil well is cased to isolate facilitate oil flow in a controlled environment and to prevent the oil well from collapsing on itself. Some casing materials include pipes, plastics, cement, and ceramics. A preferred casing embodiment is cemented steel pipe. Once the oil well is cased, shaped-charge explosives are preferably used to create perforations in the oil well casing, preferably at the bottom of the oil well casing, in order to establish fluid communication between the oil bearing formation and the oil well so as to allow fluids to enter the oil bearing formation and to allow oil to flow into the oil well. In one alternative embodiment, acid is pumped down into the oil well to dissolve channels in the limestone that prevent oil from entering the oil well. In another alternative embodiment, high pressure fluid and proppant is rapidly pumped down the oil well to create fractures in the oil bearing formation through which better fluid communication between the oil well and for formation is established.

Once the EWR reaction occurs and the reaction products are forced into the oil bearing formation at the bottom of the oil well, the affected oil is more able to flow towards and enter into an oil well where it is pumped to the surface and further processed if necessary. This oil is recovered using production equipment means known in the art. Production equipment is used to extract oil from the bottom of the oil well. In one preferred embodiment, an oil extraction pump is placed at the bottom of the oil well to pump out the oil which is conveyed to the surface through the use of tubing.

In one embodiment, a single oil well is used in a cyclical stimulation process. The EWR reacts with water at the bottom of the oil well whereby the products of the EWR reaction are forced into the oil bearing formation and then allowed to equilibrate or soak for a period of hours to days to weeks depending on the particular characteristics of the application (e.g. EWR type, dimensions, water soluble coating, temperature, pressure, other compounds in oil well, etc.) and oil formation (e.g. temperature, pressure, other compounds, etc.). Finally, an oil extraction pump is placed in the oil well and the affected oil that flows into the oil well is pumped to the surface.

In one embodiment, one or more production wells, preferably a plurality of production wells, surround an injection well. Each production well is in fluid communication with the injection well. The EWR and water are continuously injected into the injection well and the products of the EWR reaction interact with the oil in place and provide energy to continuously push and sweep oil from the injection well to the production wells.

In another embodiment, a plurality of injection wells surround a single production well. In this embodiment, EWR and water are continuously injected into the injection wells and the products of the EWR reaction interact with the oil in place and provide energy to continuously push and sweep oil from the injection well to the production well.

In another embodiment, the oil well is located off-shore. This method for oil recovery is especially useful at off-shore platform sites where there is limited space available at the surface of the oil well.

Exothermic Water Reactant (EWR)

The EWR is comprised of one or more elements which react with water to generate heat and preferably other compounds useful in the extraction of oil. Therefore, EWR reaction is between the EWR and water. Preferably, the EWR reaction does not consume all the water, but leaves an excess of water for the generation of steam and aqueous alkali solution. The EWR is preferably comprised of one or more alkaline metals, alkaline earth metals, metal hydrides, or a combination thereof. More preferably, the EWR is lithium, sodium, potassium, rubidium, beryllium, magnesium, calcium, strontium, barium, a metal hydride thereof, or a combination thereof.

The EWR is encapsulated in a water soluble coating meaning the EWR is substantially covered and protected from reacting with the water. Preferably, the EWR is completely encased by the water soluble coating to prevent even a partial reaction with water until the EWR is placed at a desired location within the injection well.

The EWR encapsulated in a water soluble coating is introduced to the injection water stream at the surface and pumped down tubing of the injection well. The EWR reaction of the EWR and the surrounding water is preferably delayed by the water soluble coating until the EWR reaches an optimal location. The quantity and rate of water and EWR injected is preferably optimized to produce the most effective reactant product for a given location. Sodium is a preferred EWR but certainly other EWRs could be used.

The EWR reaction with water preferably occurs at an optimal location. In order to control when the EWR reaction takes place, the EWR with an appropriate coating thickness is selected based on the depth to the EWR reaction location and the velocity of the injection stream. Selection of the appropriate coating and thickness delays the EWR reaction with water until the optimal location is reached. The appropriate size of the EWR and the EWR to water ratio is selected to deliver an optimized EWR reaction product to the oil bearing formation.

In one embodiment, The EWR preferably is held in place at the bottom of the oil well through the use of a screen such that the large majority of the EWR reaction takes place within the oil well. FIG. 4 shows an embodiment of an oil well 1, with a cemented steel casting 31, in which a screen 35 covers the perforations 27, preventing the EWR encapsulated in water soluble coating 5 from passing through the perforations 27. Very small pieces of EWR may escape the oil well through perforations and travel into the oil bearing formation, but these will preferably quickly react, dissipate and not restrict fluid flow into the oil bearing formation by clogging formation flow paths. The products of the EWR reaction preferably exit the oil well and enter the oil bearing formation where heat is dissipated through contact with the oil and the oil bearing formation surrounding the oil well. The alkali solution also mixes with the oil surrounding the oil well and forms a surfactant that reduces the interfacial tension between the oil and the water.

The temperature at the surface of the oil well will be unaffected by the EWR reaction because the heat is generated at the bottom of the oil well and flows from the oil well into the surrounding oil bearing formation where it is dissipated by transfer to the downhole environment. The heat from the EWR reaction will further dissipate during the equilibration phase if employing a cyclical stimulation or as the products travel towards the production well if employing a continuous injection scheme. Therefore, production equipment used to extract the oil can operate at temperatures significantly lower than the EWR reaction temperature.

The EWR may have a variety of shapes and dimensions. In one embodiment, the EWR is shaped as a rectangular compressed mass having a brick or rectangular block form. In another embodiment, the EWR is shaped as round, spherical, or cylindrical small pellets. Preferably, pluralities of EWR encapsulated in a water soluble coating are used. In a preferred embodiment, a plurality of EWR pellets having a diameter between ¼ inch to ½ inch each encapsulated in a water soluble coating are used.

Water Soluble Coating

Suitable embodiments for a water soluble coating encapsulating the EWR include, but should not be limited to: sugar, water paints, urea, calcimine, cement powder, water soluble polymers, or combinations thereof. U.S. Pat. Nos. 4,196,113 and 4,347,241 hereby fully incorporated by reference, are other examples of suitable coatings. A preferred water soluble coating is sugar. A water soluble coating allows the EWR to position itself at an optimal location in the oil well, preferably at the bottom, before the EWR reaction takes place. A coating of a known thickness and a known dissolution rate in water will enable the proper placement of the EWR before exposure to water and will prevent the EWR reaction between the EWR and water from taking place before placement at the optimal location.

Tubing

Tubing is preferably used to guide the EWR and water to the bottom of an oil well, as well as to recover affected oil from the bottom of the oil well. The tubing is preferably made out of materials including ceramic, aluminum and steel. The tubing can vary in diameter depending on the diameter of the created oil well, the expected injection and production rates, and size of the EWR. The tubing lengths will also vary depending on the depth of the oil well. If only a single well is used for both insertion of the EWR encapsulated by a water soluble coating and the oil extraction, different tubing for insertion and extraction may be used, or more preferably the same tubing is used for both operations.

Injection Pump and Oil Extraction Pump

An injection pump is used to pump the EWR and water into an oil well. The EWR and water is preferably stored in a separate reservoir and connected to the injection pump.

In one embodiment, the EWR and water are mixed and then passed through an injection pump where they are pumped together through injection tubing. In this embodiment, the EWR is preferably dry-fed into the water supply stream before the injection pump (upstream of the injection pump), whereby the EWR flows into the water supply stream into a pump, through injection tubing into the oil well. In this embodiment, the water soluble coating of the EWR is preferably specifically designed to be strong enough to withstand abrasions caused by the pumping action of the injection pump.

In an alternate embodiment, water passed through an injection pump and EWR is subsequently injected after the injection pump (downstream), preferably through one or more valving systems allowing the EWR to be introduced to the water downstream of the injection pump.

The oil extraction pump is used to pump oil out of the oil well. After the EWR reaction takes place, affected oil enters into the oil well for recovery. An oil extraction pump is placed at the bottom of the oil well to pump oil out of the oil well through tubing.

FIG. 1

FIG. 1 shows a cross-sectional view of In Situ Generation of Steam and Alkaline Surfactant for Enhanced Oil Recovery using an exothermic water reactant (EWR). FIG. 1 depicts an oil well 1 having a cemented steel casing 31 lining the inner wall of the oil well 1 and perforations 27 through the cemented steel casing 31 at the bottom of the oil well 1. In this embodiment, the oil well 1 is preferably drilled to approximately 6,000 feet at approximately 1,500 feet increments. The drill steps depicted in FIG. 1 are exaggerated and not representative of actual depths. Preferably, the oil well 1 has a twelve inch surface diameter, which is cumulatively decreased by two inches at each increment. At each drill step, a cemented steel casing 31 is cemented to the inner wall of the oil well 1 to maintain the integrity of the oil well 1 and seal exposed formations and prevent contamination of these formation with other fluids within the oil well 1. In its final condition the oil well 1 preferably contains three sets of cemented steel casings 31 in order to capture the oil and allow for extraction. Perforations 27 through the cemented casing are then created at the bottom of the oil well 1 so that the fluids in the oil well 1 are in communication with the fluids in the oil bearing formation 15.

Next, water 7 and the EWR encapsulated in a water soluble coating 5 are pumped into the oil well 1 via the injection tubing 21 by pressure provided by the injection pump 33. When the water soluble coating of the EWR encapsulated in a water soluble coating 5 dissolves, the water 7 and the EWR 17 react to produce an aqueous alkali solution 25, steam 19, and hydrogen. These products exit the oil well 1 through perforations 27 at the bottom of the oil well 1, travel through the interconnected pore spaces of the oil bearing formation 15 surrounding the oil well 1, and heat the oil in the oil bearing formation. The alkali solution 25 mixes with the oil and forms a surfactant that reduces the interfacial tension between the oil and the water. As a result, viscosity of the oil in the oil bearing formation 15 is reduced. Additionally, the interfacial tension between the oil in the oil bearing formation and the interstitial water is reduced. Thus, the affected oil will more easily and efficiently flow through the interconnected pores of the oil bearing formation and enter the oil well 1 through the perforations 27 for extraction from the well oil 1 (see FIG. 2).

FIG. 2

Figure 2:
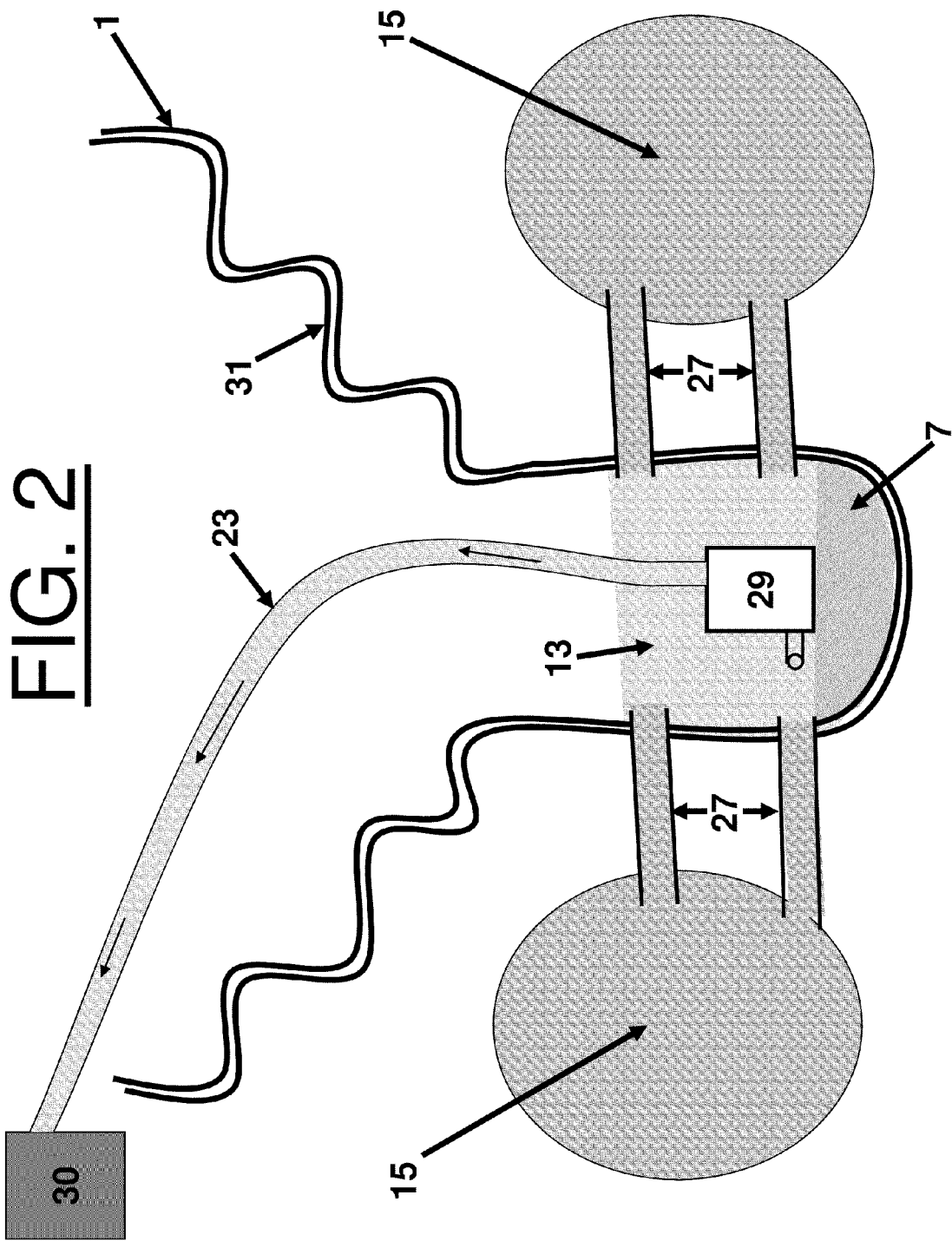
FIG. 2 illustrates a cross-sectional view of one embodiment of the bottom of an oil well containing affected oil resulting from the EWR reaction created in FIG. 1.

FIG. 2 illustrates a cross-sectional view of one embodiment of the bottom of an oil well containing affected oil resulting from the EWR reaction created in FIG. 1. After the EWR reaction takes place, and the oil bearing formation is allowed to equilibrate, the oil well 1 contains excess water 7 and affected oil 13 that has entered into the oil well 1 through the perforation 27. An oil extraction pump 29 and production tubing 23 are then placed in the oil well 1 and used to recover the affected oil 13 as it enters the oil well 1. The affected oil 13 is then pumped out of the oil well 1 into a reservoir 30.

FIG. 3

FIG. 3 shows a cross-sectional view of one embodiment of In Situ Generation of Steam and Alkaline Surfactant for Enhanced Oil Recovery using an exothermic water reactant (EWR) having an injection well and a production well. Shown is an injection well 9 and a production well 11. The production well 11 is in fluid communication with the injection well 9 through natural interconnected pore space within the oil bearing formation underground. Once the water soluble coating of the EWR encapsulated in a water soluble coating 5 dissolves, the EWR reacts within the injection well 9. The EWR reaction produces steam 19, alkali solution 25, and hydrogen which enter the oil bearing formation surrounding the production well 11 through the perforations 27. Raising the temperature of the oil in the oil bearing formation by coming into contact with the steam will result in a reduction of viscosity of the contacted oil in the oil bearing formation. The alkali solution when contacting the oil in the oil bearing formation will result in a reduction of the interfacial tension between the contacted oil and the injected water that provides some of the driving energy to move oil towards and into the production well 11 where it can be extracted.

In an alternative embodiment, a plurality of production wells 11, a plurality of injection wells 9, or a combination thereof are used. In one such embodiment, a single injection well 9 is used to force the reaction products of an EWR and water into oil bearing formations, reducing viscosity and lowering the interfacial tension of the oil, which is finally extracted using the plurality of production wells 11. In this embodiment, the single injection well 9 is preferably surrounded by a plurality of production wells 11 equally separated.

In an alternative embodiment, a plurality of injection wells 9 are used to force the reaction products of an EWR and water into oil bearing formations, reducing viscosity and lowering the interfacial tension of the oil, which is finally extracted using a single production well 11. In this embodiment, the single production well 11 is preferably surrounded by a plurality of injection wells 9 equally separated.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. §112, 6. In particular, the use of "step of" in the claims herein is not intended to invoke the provisions of 35 U.S.C. §112, ¶6.

The invention claimed is:

1. A method for oil recovery comprising:
 a) creating one or more oil wells in earth comprising oil;
 b) providing an exothermic water reactant (EWR) encapsulated in a water soluble coating; said EWR comprising a material from the group of materials consisting of one or more alkaline metals, alkaline earth metals, metal hydrides, and combinations thereof;
 c) providing water;
 d) mixing said provided water and said provided EWR at a ratio resulting in an excess water after the reaction between said provided EWR and said provided water;
 e) pumping said mixed water and EWR, in at least one oil well from among said one or more oil wells and thereby creating affected oil through the interaction between the EWR reaction products and said oil, whereby said EWR and said water react, creating an alkali solution, steam, and hydrogen which decreases the viscosity of said oil and lowers the interfacial tension of said oil, thus creating conditions under which the affected oil more easily and efficiently flows through the interconnected pore spaces of an underground oil bearing formation and passes into at least one oil well from among said one or more oil wells; and f) recovering said affected oil from at least one oil well from among said one or more oil wells.

2. The method for oil recovery of claim 1 whereby said step of providing an exothermic water reactant (EWR) encapsulated in a water soluble coating comprises providing an EWR from the group of EWRs consisting of lithium, sodium, potassium, rubidium, beryllium, magnesium, calcium, strontium, barium, a metal hydride thereof, and combinations thereof encapsulated in a water soluble coating.

3. The method for oil recovery of claim 1 whereby said step of providing an exothermic water reactant (EWR) encapsulated in a water soluble coating comprises providing a sodium encapsulated in a water soluble coating.

4. The method for oil recovery of claim 1 whereby said step of providing an exothermic water reactant (EWR) encapsulated in a water soluble coating comprises encapsulating said EWR with a compound from the group of compounds consisting of sugar, water paints, urea, calcimine, cement powder, water soluble polymers, and combinations thereof.

5. The method for oil recovery of claim 1 whereby said step of providing an exothermic water reactant (EWR) encapsulated in a water soluble coating comprises encapsulating said EWR with sugar.

6. The method for oil recovery of claim 1 whereby said step of creating one or more oil wells comprises creating one or more oil wells in earth at least 2,000 feet deep.

7. The method for oil recovery of claim 1 whereby said step of creating one or more oil wells comprises creating one or more oil wells at an off-shore platform.

8. The method for oil recovery of claim 1 whereby said step of creating one or more oil wells comprises:
i) incrementally drilling one or more oil wells at different diameters at least 2,000 feet deep in earth comprising oil;
ii) casing the interior wall of said one or more oil wells;
iii) creating perforations at the bottom of said one or more oil wells; and
iv) separating said EWR encased in a water soluble coating from said perforations with a screen.

9. The method for oil recovery of claim 1 further comprising:
g) said step of creating one or more oil wells comprises creating one or more injection wells and one or more production wells;
h) said step of pumping said mixed provided water and said provided EWR comprises pumping said mixed water and EWR in at least one injection well from among said one or more injection wells; and
i) said step of recovering said affected oil comprises recovering said affected oil that has entered said one or more production wells.

10. The method for oil recovery of claim 9 whereby said step of creating one or more injection wells and one or more production wells comprises:
i) incrementally drilling one or more injection wells and one or more production wells at different diameters at least 2,000 feet deep in earth comprising oil;
ii) casing the interior wall of said one or more injection wells and one or more production wells;
iii) creating perforations at the bottom of said one or more injection wells and one or more production wells; and
iv) separating said EWR encased in a water soluble coating from said perforations with a screen.

11. The method for oil recovery of claim 9 whereby said step of providing an exothermic water reactant (EWR) encapsulated in a water soluble coating comprises providing sodium encapsulated in a water soluble coating.

12. The method for oil recovery of claim 10 whereby said step of recovering said affected oil comprises using an extraction pump and tubing to recover said affected oil from at least one production well from among said one or more production wells.

13. A method for oil recovery comprising:
a) incrementally drilling at different diameters, one or more oil wells in earth comprising oil;
b) casing the interior wall of said one or more oil wells;
c) creating perforations at the bottom of each said oil well;
d) covering said perforations with one or more screens;
e) providing water;
f) providing sodium encapsulated in a water soluble coating;
g) mixing said provided water and said provided sodium encapsulated in a water soluble coating at a ratio resulting in an excess water after the reaction between said provided sodium and said provided water;
h) pumping said mixed water and sodium encapsulated in a water soluble coating, in at least one oil well from among said one or more oil wells and thereby creating affected oil through the interaction between the EWR reaction products and said oil, whereby said EWR and said water react, creating an alkali solution, steam, and hydrogen which decreases the viscosity of said oil and lowers the interfacial tension of said oil, thus creating conditions under which the affected oil more easily and efficiently flows through the interconnected pore spaces of an underground oil bearing formation and passes into at least one oil well from among said one or more oil wells; and
i) recovering said affected oil from at least one oil well from among said one or more oil wells using an oil extraction pump and tubing.

* * * * *